Figure 1:
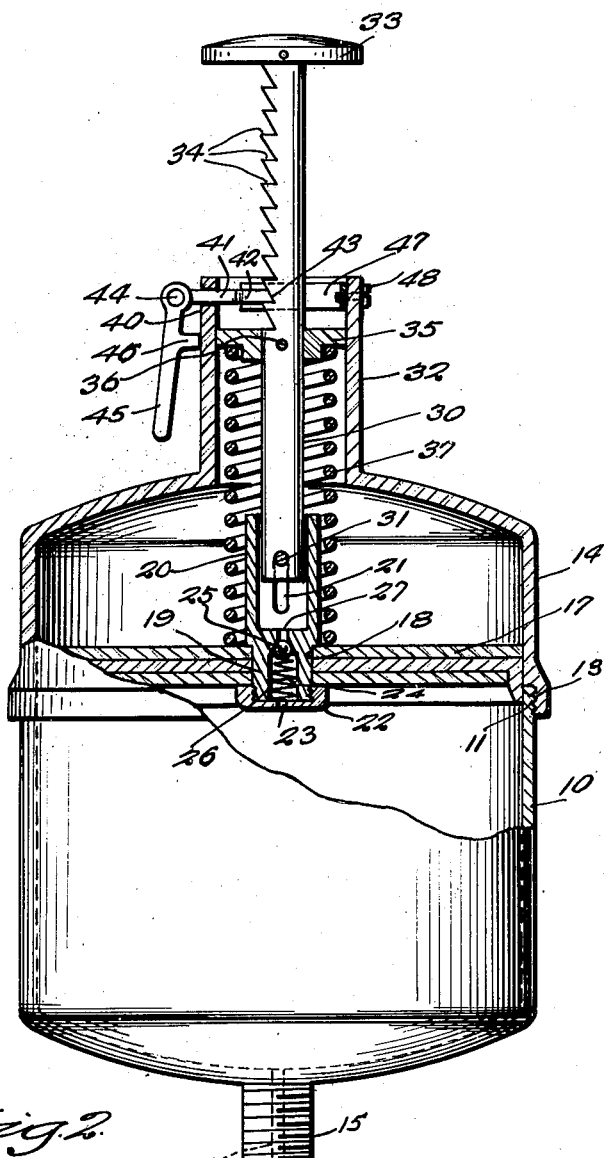

Dec. 13, 1949  J. A. FUNDERBURG  2,491,259
PAWL-TYPE ROD BRAKE FOR GREASE GUNS
Filed Aug. 30, 1944

Inventor
John A. Funderburg
By Clarence A. O'Brien
and Harvey B. Jackson
Attorneys Patented Dec. 13, 1949

2,491,259

UNITED STATES PATENT OFFICE 2,491,259

PAWL-TYPE ROD BRAKE FOR GREASE GUNS

John A. Funderburg, Oneonta, Ala., assignor to John E. Funderburg, Ashland, Ky.

Application August 30, 1944, Serial No. 551,844

2 Claims. (Cl. 188—67)

This invention relates to a grease cup and more particularly to an automatic pressure feed grease cup.

A primary object of this invention is the provision of an improved pressure feed grease cup, insuring a steady continuous feed, of a predetermined amount of grease to parts to be lubricated, for a predetermined period of time.

An additional object of this invention is the provision of improved means in association with such a grease cup whereby the pressure effecting the feed of the grease may be reset at the end of each predetermined time period in a step by step manner, until the quantity of grease in the cup is exhausted.

Still another object is the provision of such a grease cup having means whereby the pressure may be reset, at convenient intervals, by a simple pressure on an extending operating rod.

Other objects reside in the combinations of elements, arrangements of parts and features of construction, as will be more fully pointed out hereinafter and shown in the accompanying drawing, wherein there is disclosed a preferred embodiment of this inventive concept.

Figure 2:
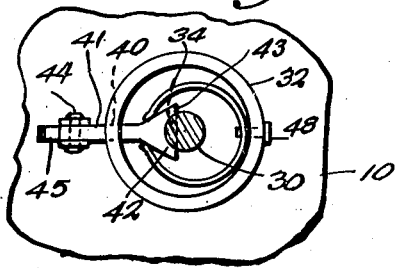

In the drawing:

Figure 1 is a side view partially in section and partially in elevation of a grease cup embodying this invention, and Figure 2 is a horizontal sectional view taken through the latching mechanism of Figure 1.

Like reference characters refer to like parts throughout the views of the drawing.

Having reference now to the drawing, the grease cup of the instant invention is comprised of a receptacle 10 threaded as at 11 to engage the threads 13 of a cap portion 14. Receptacle 10 is provided with a threaded nipple 15 having an aperture or bore 16 therethrough from which a connection not shown is adapted to lead to the part or parts to be greased. The inner surfaces of receptacle 10 and cap member 14 are flush, and positioned within the grease cup formed of the two members is a movable piston 17 having a centrally disposed aperture 18 therein through which extends the lower extremity 19 of a sleeve 20 having slotted apertures 21 therethrough. The lower end of portion 19 is threaded and has secured thereto a cap 22 adapted to hold the piston and the sleeve in related assembly. Cap 22 has an aperture 23 extending therethrough, and communicates with a recess 24 interiorly positioned in portion 19, within which is positioned a ball 25 comprising a ball valve, and biased by a spring 26 to normally close an aperture 27 leading from recess 24 to the interior of sleeve 20.

Positioned within sleeve 20 is an operating rod 30 having a pin 31 extending therethrough and adapted to engage in slots 21. Rod 30 extends upwardly through a neck 32, comprising an integral portion of cap member 14, and outwardly from the cup, terminating in an operating knob or handle 33. The upper portion of rod 30 is provided with a plurality of notches 34 for a purpose to be described hereinafter.

A collar 35 is secured to an intermediate portion of rod 30, normally positioned within neck 32, and secured thereto as by a pin 36. Surrounding rod 30 and sleeve 20, and having its opposite ends abutting collar 35 and piston 17, is a compression spring 37.

Passed through a suitable slot 40 adjacent the upper extremity of neck 32 is a detent member 41 terminating in an enlarged tapered extremity 42 having a beveled surface 43, adapted to act as a pawl in conjunction with the ratchet formed by notches 34 on operating rod 30. The outer extremity of detent 41 is provided with a pivot 44 to which is secured an operating lever 45 provided with an extending lug 46 adapted to abut the outer wall of neck 32. A clip spring 47 is secured as by a screw 48 passed through a suitable aperture in the wall of neck 32, engages the tapered rear portion of enlarged end 42 of detent 41, to hold the same in position adjacent operating rod 30 to effect a pawl action with the ratchet above mentioned.

From the foregoing the operation of the device should now be readily understandable. When it is desired to fill the cup, operating lever 45 is pressed inwardly releasing pawl or detent 41 from the notches 34 and operating rod 30 is raised to its uppermost position. The members 10 and 14 are then disassociated by unscrewing the same and the receptacle 10 is filled with grease. Cap 14 is then rethreaded on receptacle 10 and operating rod 30 pushed downwardly by handle or rod 33 until the lowermost of notches 34 is engaged by detent 41. Lubricant or grease within receptacle 10 is thus forced slowly and steadily outward through aperture 16 to lubricate the desired parts. After a predetermined interval, or when it is estimated that the pressure on the grease has been reduced to an extent to preclude further flow of grease, the knob 33 is pushed downwardly until the next notch is engaged by detent 41, such downward action forcing the pins 31 to the bottom of slots 21, whereupon the spring 37 serves to force the piston downwardly until such time as the pin 31, is in abutting relation with the tops of slots 21, at which time the pressure on the grease is relieved, and the operating rod pushed down another notch.

This action is successively repeated until the grease in the grease cup is substantially exhausted whereupon the same is refilled in the manner previously described.

It may here be pointed out that the valve comprised of spring-pressed ball 25 is used solely to relieve any vacuum which might exist in the receptacle 10, after the grease therein is exhausted, to permit ready withdrawal of the piston to its uppermost position when it is desired to refill the grease cup.

From the foregoing it will now be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a pressure greasing device, a housing, a ratchet rod slidably and guidingly received in said housing, an opening in said housing and a pawl slidable through said opening for engagement with said ratchet rod, a lever pivoted to said pawl externally of said housing, and spring means within said housing engaging said pawl for biasing the latter against said ratchet rod, said spring means comprising an arcuate leaf spring encircling said ratchet rod, said spring being mounted on the inside of said housing and having its extremities engaging said pawl.

2. In a pressure greasing device, a housing, a ratchet rod slidably and guidingly received in said housing, an opening in said housing and a pawl slidable through said opening for engagement with said ratchet rod, a lever pivoted to said pawl externally of said housing, and spring means within said housing engaging said pawl for biasing the latter against said ratchet rod, said pawl having a head portion for engaging said ratchet rod, said head portion having surfaces converging rearwardly from its ratchet rod engaging end, said spring resiliently engaging said surfaces, said spring including members yieldingly embracing said surfaces and urging said pawl toward said ratchet rod, said members comprising the extremities of an arcuate leaf spring, said leaf spring surrounding said ratchet rod and being mounted intermediate its extremities on said housing.

JOHN A. FUNDERBURG.

REFERENCES CITED

The following references are of record in the file of this patent:

UNITED STATES PATENTS

| Number | Name | Date |
|---|---|---|
| 278,172 | Ortman et al. | May 22, 1883 |
| 425,936 | Essex | Apr. 15, 1890 |
| 440,309 | Hart | Nov. 11, 1890 |
| 984,481 | Hickish | Feb. 14, 1911 |
| 1,048,104 | Shrader | Dec. 24, 1912 |
| 1,072,313 | Conte | Sept. 2, 1913 |
| 1,641,125 | Dawson | Aug. 30, 1927 |
| 1,695,564 | Thomas | Dec. 18, 1928 |
| 1,721,227 | Manley | July 16, 1929 |

FOREIGN PATENTS

| Number | Country | Date |
|---|---|---|
| 17,766 | Great Britain | Nov. 10, 1900 |